USO10419064B2

(12) United States Patent
Cosic et al.

(10) Patent No.: US 10,419,064 B2
(45) Date of Patent: Sep. 17, 2019

(54) ONE-WAY BROADCAST COMMUNICATION

(71) Applicant: Schweitzer Engineering Laboratories, Inc., Pullman, WA (US)

(72) Inventors: Miralem Cosic, Spokane, WA (US); Shankar V. Achanta, Pullman, WA (US); Raymond W. Rice, Pullman, WA (US); Chen Zhu, Pullman, WA (US); Bryson R. Bechtel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 15/940,721

(22) Filed: Mar. 29, 2018

(65) Prior Publication Data

US 2018/0287658 A1    Oct. 4, 2018

Related U.S. Application Data

(60) Provisional application No. 62/479,518, filed on Mar. 31, 2017.

(51) Int. Cl.
| H04K 1/10 | (2006.01) |
| H04L 27/28 | (2006.01) |
| H04B 1/713 | (2011.01) |
| H04L 12/26 | (2006.01) |
| H04B 1/7143 | (2011.01) |
| H04L 12/24 | (2006.01) |

(52) U.S. Cl.
CPC ........... *H04B 1/713* (2013.01); *H04B 1/7143* (2013.01); *H04L 41/0803* (2013.01); *H04L 43/10* (2013.01)

(58) Field of Classification Search
CPC ....... H04B 1/713; H04B 1/7143; H04L 43/10; H04L 41/0803; H04W 72/02
USPC .......................................... 375/260, 132–135
See application file for complete search history.

(56) References Cited

U.S. PATENT DOCUMENTS

| 5,862,186 A | 1/1999 | Kumar |
| 6,901,242 B2 | 5/2005 | Kroeger |
| 7,729,405 B2 | 6/2010 | Inoue |
| 2014/0119331 A1* | 5/2014 | Ji ......................... H04W 72/02 370/330 |

* cited by examiner

*Primary Examiner* — Phuong Phu
(74) *Attorney, Agent, or Firm* — Stoel Rives LLP; Richard M. Edge

(57) ABSTRACT

Systems, methods, and apparatuses for one-way communications are disclosed. A system includes a transmitter, a first receiver, and a second receiver. A transmitter transmits one or more messages on one or more channels according to a predetermined, pseudo-random channel hopping protocol. The receivers receive said transmissions according to the order of the pseudo-random channel hopping protocol. Methods for re-syncing the one-way system in the event of a power loss or other event causing desynchronization. Default waiting channels are established for the receivers once a certain number of channel detection periods according to the one-way communication protocol result in no detected signals.

20 Claims, 9 Drawing Sheets

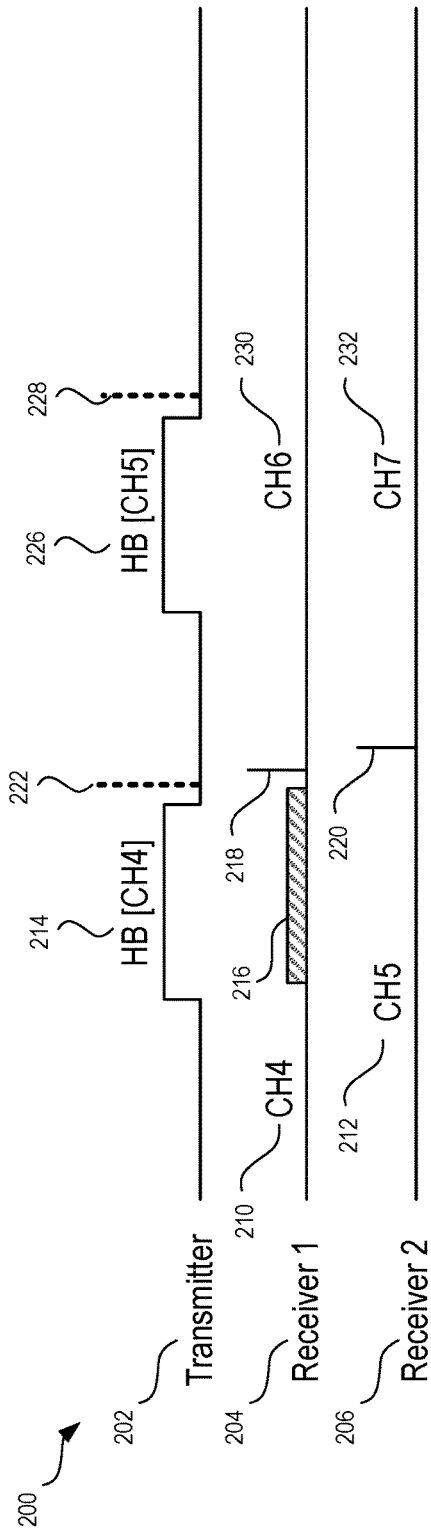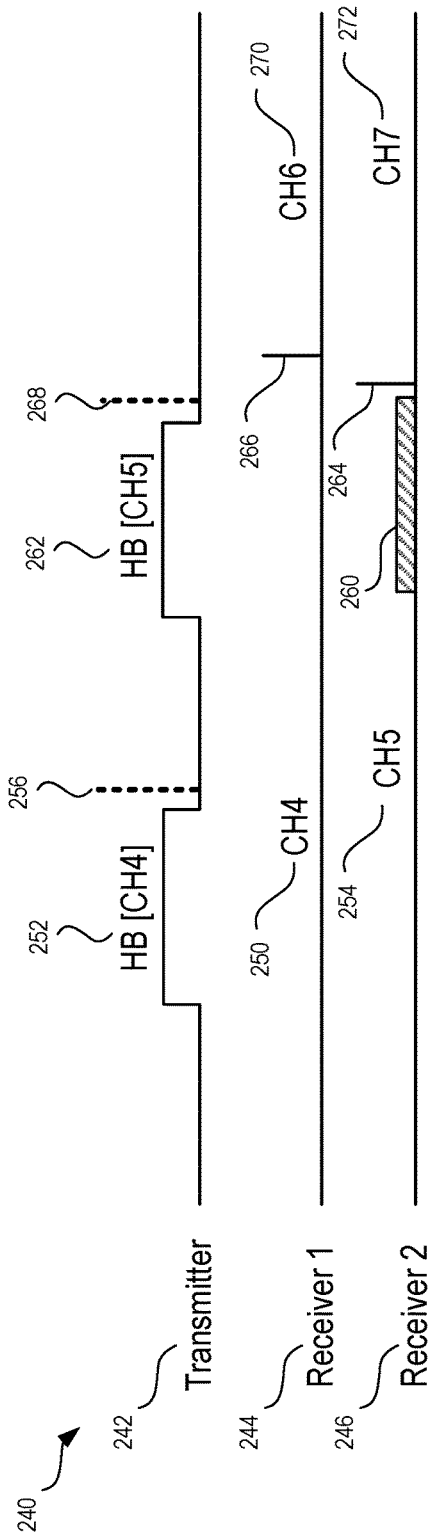

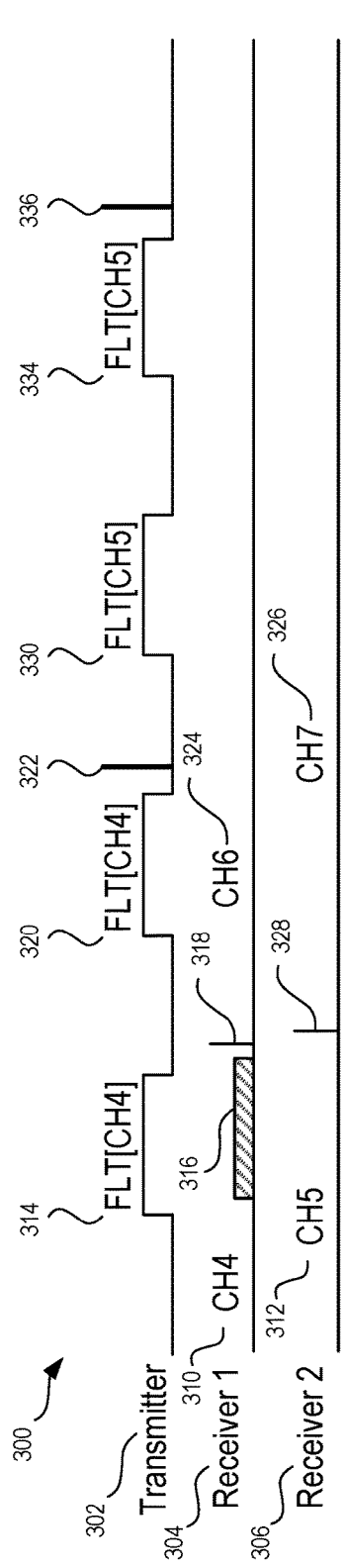
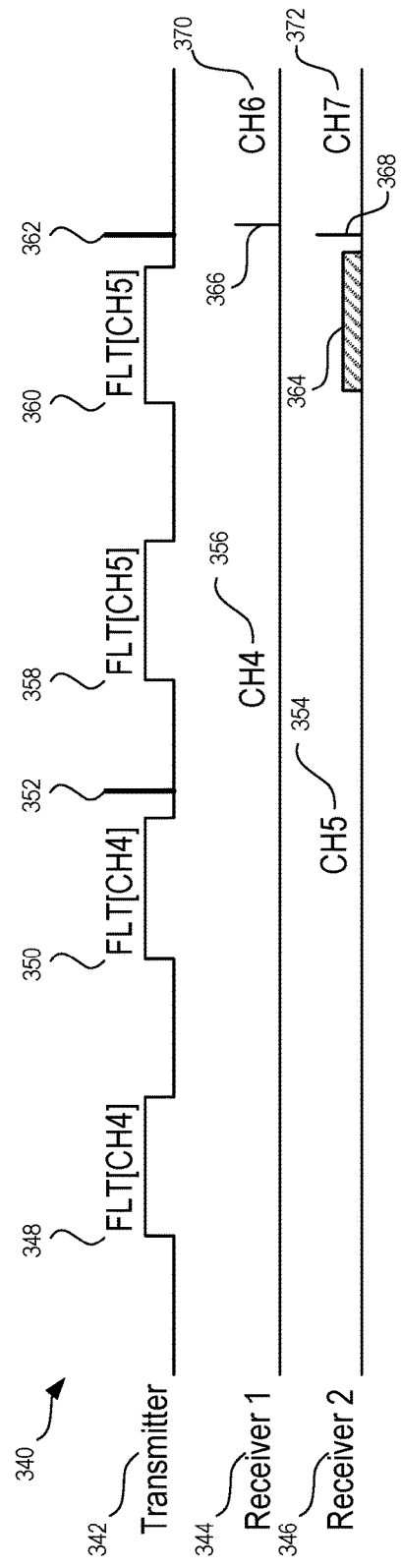
FIG. 3A
FIG. 3B

ONE-WAY BROADCAST COMMUNICATION

RELATED APPLICATIONS

This application claims the benefit of U.S. Provisional Patent Application No. 62/479,518, titled "Electric Power Monitoring System Using One-Way Communication," filed Mar. 31, 2017, which is hereby incorporated by reference herein in its entirety.

TECHNICAL FIELD

This application relates to systems and methods for communications, and more specifically to systems and methods for one-way radio or other broadcast communications, such as may be used according to a frequency hopping spread spectrum (FHSS) scheme within an unlicensed band (e.g., 902-928 MHz).

BRIEF DESCRIPTION OF THE DRAWINGS

Non-limiting and non-exhaustive embodiments of the disclosure are described herein, including various embodiments of the disclosure with reference to the figures listed below.

FIGS. 2A and 2B illustrate timing diagrams corresponding to one-way communications, according to various embodiments of the present disclosure.

FIGS. 3A and 3B illustrate timing diagrams corresponding to one-way communications, according to various embodiments of the present disclosure.

DETAILED DESCRIPTION OF PREFERRED EMBODIMENTS

Figure 1:
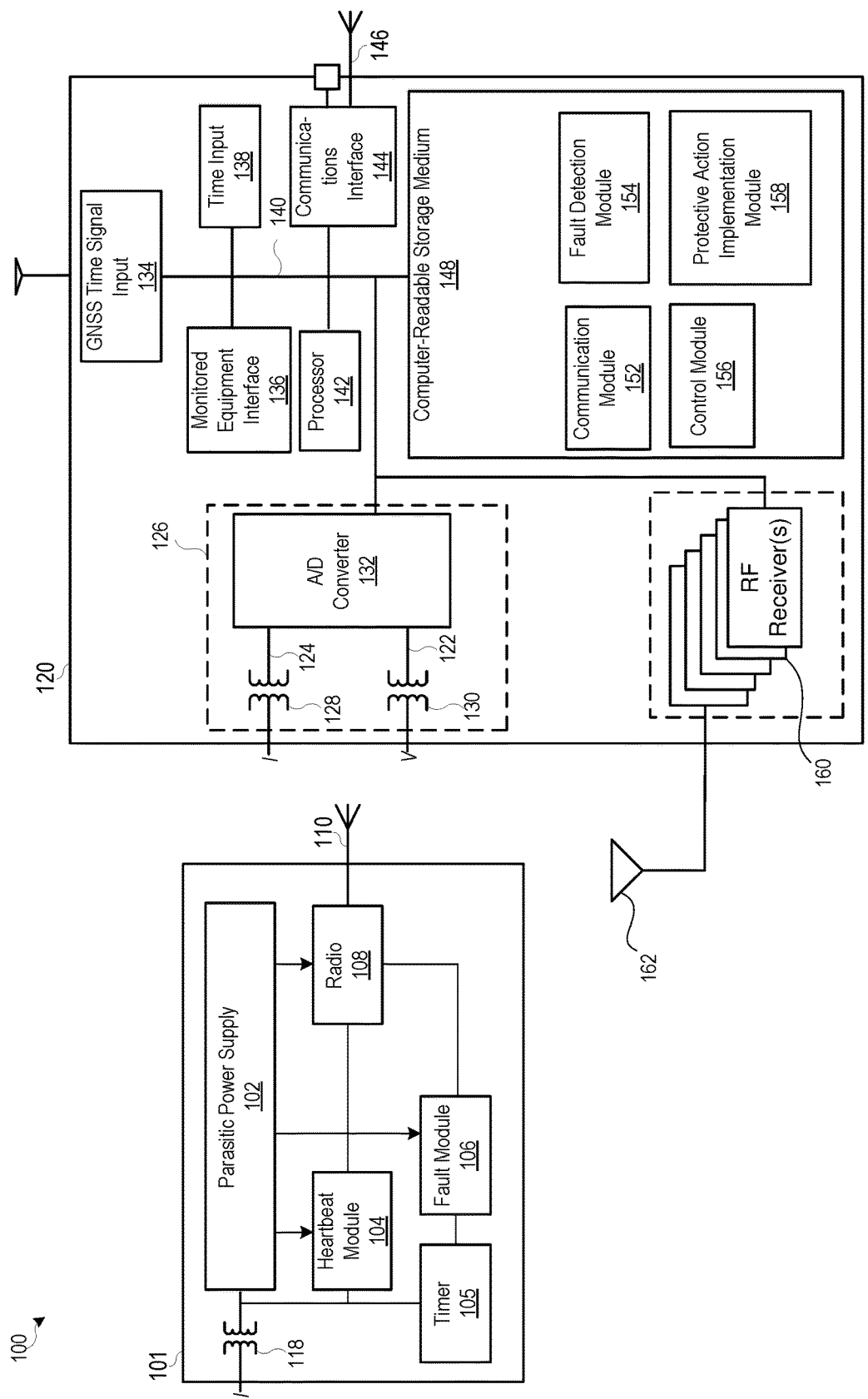
FIG. 1 illustrates a simplified functional block diagram of a system for one-way communications, according to one embodiment of the present disclosure.

Electric power system monitoring may benefit from power system conditions obtained from various locations in the electric power system. In addition to use of electric power system conditions obtained at substations, conditions at distributed locations on conductors between traditional monitoring points may be beneficial. To that end, conductor-mounted devices (CMDs) may be used to obtain power system information from distributed locations on the power system.

In order to transmit information obtained by CMDs to control and monitoring systems, CMDs may be configured to transmit information to intelligent electronic devices (IEDs), which may be configured to provide monitoring and/or protection functions, or further transmit the information to control and monitoring systems. CMDs may be configured to parasitically obtain electric power from the conductor to which it is mounted, determine conditions using the electric power, and transmit information using the electric power.

The present disclosure provides systems, methods, and apparatuses that may utilize one or more transmitting devices that can transmit data to, but that do not receive data from, one or more receiving devices. This may be referred to as "one-way" communication throughout this specification. The systems, methods, and apparatuses of this disclosure may utilize one or more transmitting devices. A transmitting device may be a device that is capable of sending a message along a physical medium (e.g., a device for sending radio transmissions through the air). A transmitting device may include one or more transmitters capable of transmitting a message along a physical medium. Examples of transmitters include but are not limited to radio transmitters, light transmitters, or any other device capable of transmitting information.

The systems, methods, and apparatuses of this disclosure may utilize one or more receiving devices. A receiving device may be capable of receiving a message sent along a physical medium. A receiving device may include one or more receivers capable of receiving a message along a physical medium.

In terms of the above disclosure, a CMD may be a transmitting device and an IED may be a receiving device. The specific names or labels of any transmitting device or receiving device given in this disclosure are given by way of example and not by way of limitation. The proceeding discussion will sometimes talk in terms of wireless radio communication through the use of radio transmission and reception equipment; this is done simply for convenience. This invention also contemplates that a message may be sent through wired electronic communication, through fiber optic communication, or by another other means of communication of a message that is known by those with skill in the art. It should also be understood that the spirit of the invention includes messaging through physical media other than air, such as water, metal wire, fiber optic, or any other suitable medium for communications that is known to those with skill in the art.

In many types of possible physical transmission media, it is possible to divide an overall transmission space into one or more channels. A channel may in some cases be a transmission resource defined as one or more subsets of frequencies within a given transmission bandwidth. It may also be a transmission resource defined as one or more divisions of time within a given transmission band (or a given set of frequencies within a given transmission band). It may also be a transmission resource that is defined both by a frequency (or set of frequencies) in a band and a division of time for the use of those frequencies. A channel may be any other determinable logical transmission resource allocation. One or more channels in a system may be associated with one or more physical transmission media. The use of certain bands and/or certain channels within a band may be limited by regulation, technological feasibility, financial feasibility, etc.

In many cases, it may be desirable to transmit communication wirelessly. In some cases, it may be desirable to transmit this communication through the use of unlicensed wireless bands. However, the use of unlicensed wireless bands may in some circumstances be constrained by public regulations. For example, FCC regulation 15.247 governs the operation of unlicensed devices in the 902-928, 2400-2483.5, and 5725-5850 MHz bands in the United States.

In some cases, it is possible to organize channels in an order corresponding to their signal attributes (e.g., increasing or decreasing frequency order). A channel hopping mechanism may hop between channels organized this way in a pseudo-random nature. A pseudo-random hopping mechanism may thus proceed in a predetermined order that was initially generated by randomizing the organization of channels based on, for example, frequency.

A pseudo-random channel order may have further benefits. As will be discussed below, some embodiments disclosed herein may have two or more transmitting devices utilizing the same physical communication medium to communicate with one or more receiving devices. In this case, if each transmitting device utilizes a different pseudo-random hopping order, the potential for long-term channel use conflicts between the two or more transmitting devices on said physical communication medium is greatly reduced. This is because if any two transmitting devices in a system are using the same channel at any particular time, after they hop, the two transmitting devices will very likely not end up on the same channel after the hop. (In certain embodiments, two transmitting devices will never end up on the same channel after the hop.) Thus, the channel interference issue will have been only temporary, even if the hopping timing across the two or more devices also happens to substantially align. This benefit will also be realized in the case of interference from a transmitting device located outside the system which is also using a pseudo-random hopping order.

Some hardware configurations working in a band and under a given set of restraints may be able to both provide a necessary power output and comply with the structures of the restraints regulating use of that band by implementing a pseudo-random channel hopping mechanism for these transmissions. For example, it may be that implementing a channel hopping mechanism would allow a system to achieve a necessary power output within the 902-928, 2400-2483.5, and 5725-5850 MHz bands and comply with FCC regulation 15.247 by using a channel hopping mechanism Other embodiments using a channel hopping mechanism may instead utilize a hopping order that simply follows a natural sequential organization according to frequency, or any other order conducive to a channel hopping mechanism.

Embodiments herein will discuss a "hop" or a "change" from one channel to another. For purposes of this disclosure, the numerals of channel labels such as "channel 1" or "channel 5" should be understood to represent the location of that channel in a predetermined, pseudo-random channel hopping order. Thus, a next channel in a channel hopping order may not necessarily be the following channel in an organization that is based on any physical or electrical attributes (such as increasing or decreasing frequency); rather the next channel can be any other channel that the system may use for transmission according to a pseudo-random channel hopping order.

In some cases, multiple transmitters in a system may utilize subsets of the same predetermined channel hopping order. For example, one transmitter in the system may hop between channels 1, 3, 5, etc. of a predetermined channel order, and another transmitter in said system may hop between channels 2, 4, 6, etc. of said predetermined channel order. Other subset arrangements (including subset arrangements not following a recognizable pattern) are contemplated.

A system according to current embodiments may be further constrained by a need to transmit in only one direction. For at least some hardware configurations operating in some bands, it may be desirable to use a one-way communication mechanism in order to comply with the structures of the regulations governing use of a given band. In some cases, the use of one-way communications may enjoy other benefits, such as using less hardware by obviating the need for one or more receivers on a transmitting device and/or one or more transmitters on a receiving device. Further, systems implementing a one-way communications mechanism may use less power than systems not using a one-way communications mechanism.

In still other cases, it may be desirable for some systems to use both a channel hopping mechanism and a one-way communication mechanism in tandem. This may, for example, make the system compliant with constraints on the use of certain wireless bands. As an example, this may be because the particular transmission power desired can be achieved within the structures of the regulations of the band by implementing both a channel hopping mechanism and a one-way communication mechanism.

Channel hopping mechanisms are especially difficult in a one-way communications context that utilizes one or more transmitting devices and one or more receiving devices. The one-way nature of the transmissions may prevent the feedback of any reception status information from a receiving device to a transmitting device. A lack of feedback of information from a receiving device to a transmitting device may make it difficult to account for changes in state across all the devices at any one device in a system. One example of where this may be a problem is as to synchronization between various devices regarding channel hopping timings. For example, in a one-way communication system, there may be no way to send channel hopping timing data from a receiving device to a transmitting device in order to synchronize or re-synchronize the devices using that shared data. In this way, it may be the case that even if a transmitting device and a receiving device begin a one-way channel hopping communications protocol with synchronized timings, which control when to hop channels, over time the transmission timing on a transmitting device and the reception timing of a receiving device on a given channel may no longer overlap (due to, e.g., clock drift).

A lack of feedback may be further problematic when system interference occurs. Examples of system interference include cases where communications are blocked or otherwise interfered with, and potentially not received (or at least not received as transmitted by a transmitting device) by a receiving device. Reasons for being blocked or interfered with include, but are not limited to, physical disruption of the physical transmission medium, electromagnetic or other signal interference in the physical transmission medium by another broadcasting device using the physical transmission medium (whether or not said other device is part of the system), or damage to, removal of, or de-powering of a transmitting device. In many cases, the source of the interference may be temporary, such as in a case where an electromagnetic interference is transient, or when a de-powered transmitting device is subsequently re-supplied with power.

Accordingly, a one-way communication protocol is needed to achieve the various benefits of the use of a one-way communications system which can also work to improve the reliability of the one-way communications from the transmitting device being received by the receiving device in a context that uses both a channel hopping mechanism and a one-way communication mechanism. Such a protocol may account for the issues that occur regarding clock drift/clock synchronization, disruption or interference, or any other issue in the context of a system implementing a one-way communication protocol that implements both a one-way mechanism and a channel hopping mechanism.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

FIG. 1 illustrates a functional block diagram of a system 100 for one-way communications, according to one embodiment. The system 100 includes a CMD 101 and an IED 120. The CMD 101 may include the components necessary to provide multiple signals to the IED 120 in communication therewith. One such signal may be a heartbeat to simply indicate that the CMD 101 is functional. Another such signal may be a fault signal indicating a fault on the conductor monitored by the CMD 101.

The CMD 101 and the IED 120 may use any appropriate physical medium in order to facilitate the transmission and reception of communication. That FIG. 1 may illustrate transmission and reception over a wireless radio frequency (RF) through the air is given by way of example and not by limitation.

The CMD 101 according to the illustrated embodiment may receive a signal (such as, e.g., a current signal) provided by a conductor monitored by the CMD 101. In certain embodiments, the signal provided may be further stepped down using, for example, a transformer 118 into a signal useable by the CMD 101. The signal may be provided to a parasitic power supply 102. The parasitic power supply 102 may be configured to receive the signal from the electric power conductor, derive power therefrom, condition the power derived therefrom, and provide electrical power within predetermined specifications to the other various modules of the CMD 101. The parasitic power supply 102 may receive an alternating current signal, and include the necessary components to convert the power derived therefrom to a direct current. The parasitic power supply 102 may include a capacitor or a super-capacitor capable of storing power for use when power is not parasitically available from the conductor.

A heartbeat module 104 may receive the signal from the transformer 118, and be configured to signal a radio 108 to activate and send a signal to the IED 120 (via an antenna 110) when the CMD 101 is functional and/or when the current on the conductor is within operating parameters. The heartbeat module 104 may be in communication with a timer 105, and be configured to initiate the radio 108 and assert a heartbeat signal at multiples of a lapse of the timer 105. In one embodiment, the heartbeat module 104 may be configured to initiate the radio 108 and assert one or more heartbeat signals once per day. In another embodiment, the heartbeat module 104 may be configured to initiate the radio 108 and assert one or more heartbeat signals once every 10 minutes. In another embodiment, the heartbeat module 104 may be configured to initiate the radio 108 and assert one or more heartbeat signals once per second. In another embodiment, the heartbeat module 104 may be configured to initiate the radio 108 and assert one or more heartbeat signals once every millisecond. Other timing schemes are contemplated. A timing scheme may be periodic, or it may be aperiodic. The heartbeat module 104 may be configurable to initiate the radio 108 and assert the heartbeat signal according to any timing scheme. In cases where more than one heartbeat signal is sent according to the timing scheme, it is contemplated that individual heartbeat signals may be sent on two or more separate physical media.

The timing scheme may be limited by the amount of power available from the parasitic power supply 102, and the amount of power required by the heartbeat module 104 and the radio 108. The timing scheme may also be limited by government regulation of the transmission resource that is being used (e.g., restrictions which determine the bounds of legal usage of given frequencies in a regulated RF band). In certain embodiments, the CMD 101 may be configured to supply a repeating heartbeat signal.

The CMD 101 may further include a fault module 106 receiving the signal from the transformer 118. In certain embodiments, the fault module 106 may include a processor. In certain embodiments, the fault module 106 may receive power from the parasitic power supply 102. In certain embodiments, the fault module 106 may be implemented in hardware (such as, for example, as an integrated circuit, an application-specific integrated circuit, or the like).

In one embodiment, the fault module 106 may include a comparator for comparing an element of the signal from the transformer 118 with one or more predetermined thresholds. For example, the comparator may compare a voltage derived from the signal from the transformer 118 with one or more predetermined voltage thresholds. A voltage threshold may be an upper voltage threshold or a lower voltage threshold. If the derived voltage falls outside of a range defined by the one or more voltage thresholds, then the fault module 106 may determine a fault. When the fault module 106 determines a fault, the fault module 106 may initiate the radio 108 to transmit one or more fault signals. It is also contemplated that a comparator may compare, in analogous manner, a current derived from the signal with one or more predetermined current thresholds, or compare a power derived from the signal with one or more power thresholds, or it may use any combination of these comparisons, in determining a fault.

The fault module 106 may receive the signal from the transformer 118, and be configured to signal the radio 108 to activate and send a signal to an IED (via the antenna 110) when the CMD 101 is not functional and/or when the current on the conductor is not within operating parameters. The fault module 106 may be in communication with the timer 105), and be configured to initiate the radio 108 and assert a fault signal at multiples of a lapse of the timer 105. Alternatively, the fault module 106 may be in communication with a separate timer (other than the timer 105 illustrated). In one embodiment, the fault module 106 may be configured to initiate the radio 108 and assert one or more fault signals once per day. In another embodiment, the fault module 106 may be configured to initiate the radio 108 and assert one or more fault signals once every 10 minutes. In another embodiment, the fault module 106 may be configured to initiate the radio 108 and assert one or more fault signals once per second. In another embodiment, the fault module 106 may be configured to initiate the radio 108 and assert one or more fault signals once every millisecond. Other timing schemes are contemplated. A timing scheme may be periodic, or it may be aperiodic. The fault module 106 may be configurable to initiate the radio 108 and assert a fault signal according to any timing scheme. In cases where more than one fault signal is sent according to the timing scheme, it is contemplated that individual fault signals may be sent on two or more separate physical media, or they may be sent on the same physical medium.

In one embodiment, when the derived voltage is too low, the parasitic power supply 102 may be unable to obtain power from the conductor. The parasitic power supply 102 may include a capacitor for storing power for the instance when power to the transformer 118 is lost, such that the fault module 106 and the radio 108 may have access to sufficient power to transmit one or more signals.

In certain embodiments, the CMD 101 may be configured as a faulted circuit indicator that includes further components such as a processor capable of detecting a fault condition on the monitored conductor.

According to various embodiments herein, the radio 108 may be configured to transmit a heartbeat and/or fault signals according to a predetermined one-way communication protocol. The receiving IED 120 may include one or more receivers 160. In cases where two (or more) receivers 160 are present, two of the receivers 160 may be associated or otherwise configured to receive communications from the CMD 101. In some embodiments, other receivers 160 may receive communications from one or more other CMDs (not shown). Each receiver 160 associated with a CMD listens for communications on different channels used by the associated CMD. In the case that any receiver 160 associated with the CMD 101 receives a communication from the CMD 101, all receivers 160 associated with the CMD 101 may change their listening channels in the manner defined by a one-way communication protocol.

The IED 120 may be configured to receive communications from one or more CMDs and use such communications in its monitoring and protection of the electric power delivery system. The IED 120 may also be configured to coordinate its actions and/or the actions of one or more other IEDs based, at least in part, on information provided by the other IEDs and the CMDs.

The IED 120 may include a communications interface 144 configured to communicate with a communication network. The communications interface 144 may receive signals from one or more CMDs related to current flowing through conductors on one or more phases or sections of the electric power delivery system. Such communications interface may include an antenna 146 for receiving signals from a CMD. The IED 120 may also include a time input 138, which may be used to receive a time signal. In certain embodiments, a common time reference may be received via the communications interface 144 and, accordingly, a separate time input 138 and/or a Global Navigation Satellite System (GNSS) time signal input 134 may not be necessary. One such embodiment may employ the IEEE 1588 protocol. Alternatively, a GNSS time signal input 134 may be provided in addition to, or instead of, time input 138.

A monitored equipment interface 136 may be configured to receive equipment status information from and issue control instructions to a piece of monitored equipment, such as an electrical generator, breaker, voltage regulator controller, and/or the like. According to certain embodiments, the monitored equipment interface 136 may be configured to interface with a variety of equipment of an electric power delivery system. In certain embodiments, the equipment status information and/or control instructions may be communicated over the communications interface 144.

A computer-readable storage medium 148 may be the repository of one or more modules and/or executable instructions configured to implement any of the processes described herein. A data bus 140 may link the monitored equipment interface 136, the time input 138, the communications interface 144, the GNSS time signal input 134, the computer-readable storage medium 148, and the one or more receivers 160 to a processor 142.

The processor 142 may be configured to process communications received via the communications interface 144, the time input 138, the GNSS time signal input 134, the monitored equipment interface 136, and/or the one or more receivers 160. The processor 142 may operate using any number of processing rates and architectures. The processor 142 may be configured to perform various algorithms and calculations described herein using computer executable instructions stored on the computer-readable storage medium 148. The processor 142 may be embodied as a general purpose integrated circuit, an application specific integrated circuit, a field-programmable gate array, and/or other programmable logic devices.

In certain embodiments, the IED 120 may include a sensor component 126. In the illustrated embodiment, the sensor component 126 is configured to gather data from a location of the electric power delivery system (not shown) using a current transformer 128 and/or a voltage transformer 130. The voltage transformer 130 may be configured to step-down the power system's voltage (V) to a secondary voltage waveform 122 having a magnitude that can be readily monitored and measured by the IED 120. Similarly, the current transformer 128 may be configured to proportionally step-down the power system's line current (I) to a secondary current waveform 124 having a magnitude that can be readily monitored and measured by the IED 120. Although not separately illustrated, the voltage signal V and current signal I may be secondary signals obtained from equipment instruments designed to obtain signals from power system equipment. For example, a secondary voltage signal V may be obtained from a potential transformer (PT) in electrical communication with a conductor. A secondary current signal I may be obtained from a current transformer (CT) in electrical communication with a conductor. Various other instruments may be used to obtain signals from electric power delivery systems including, for example, Rogowski coils, optical transformers, and the like.

An analog-to-digital converter 132 may multiplex, sample, and/or digitize the measured voltage and/or current signals to form corresponding digitized current and voltage signals. Similar values may also be received from other distributed controllers, station controllers, regional controllers, or centralized controllers. The values may be in a digital format or other format. In certain embodiments, the sensor component 126 may be utilized to monitor current signals associated with portion of an electric power delivery system and/or detect interharmonic content associated with high impedance fault (HIF) events included in such monitored current signals. Further, the sensor component 126 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

The analog-to-digital converter 132 may be connected to the processor 142 by way of the data bus 140, through which digitized representations of current and voltage signals may be transmitted to the processor 142. As described above, the processor 142 may be used to apply equipment status, measurements, and derived values to an IED module. The processor 142 may be used to detect the occurrence of HIF conditions and issue control instructions in response to the same (e.g., instructions implementing protective actions).

It should be noted that a separate device may be used in place of the sensor component 126 for providing signals from the electric power delivery system to the IED 120. Indeed, a separate device may be configured to obtain signals from the electric power delivery system (such as voltage and/or current signals), and create digitized representations of the signals (for example, current and voltage signals), apply a time stamp, and/or supply such information to the IED 120. Further, the separate device may be configured to supply equipment status and/or measurements such as voltage and/or current magnitudes and/or angles along with time stamps to the IED 120. In certain embodiments, the information that has been described as received from the sensor component 126 is instead received from the communications interface 144.

The monitored equipment interface 136 may be configured to receive status information from and issue control instructions to a piece of monitored equipment. The monitored equipment interface 136 may be configured to issue control instructions to one or more pieces of monitored equipment. According to some embodiments, control instructions may also be issued via the communications interface 144. Control instructions issued via the communications interface 144 may be transmitted, for example, to other distributed controllers, coordination controllers, IEDs, or the like (not shown), which in turn may issue the control instruction to a piece of monitored equipment. Alternatively, the piece of monitored equipment may receive the control instruction directly via its own communications interface.

The computer-readable storage medium 148 may be the repository of one or more modules and/or executable instructions configured to implement certain functions and/or methods described herein. For example, the computer-readable storage medium 148 may include a fault detection module 154, which may be a repository of the modules and/or executable instructions configured to implement the HIF detection and protection functionalities described herein. The computer-readable storage medium 148 may further include a communication module 152, a control module 156, and a protective action implementation module 158.

The fault detection module 154 may be configured to receive signals (using the antenna 146) from CMDs in communication with the IED 120, including the CMD 101. As described above, the signals may include a heartbeat signal and/or a fault detection signal.

The fault detection module 154 may further be configured to use a received fault detection signal in protection algorithms. The fault detection signal may be used to coordinate operations of the IED 120. In one embodiment, the fault detection signal may be used to issue a protective command such as opening a circuit breaker. In another embodiment, the fault detection signal may be used in combination with another fault detection signal such as a high-impedance fault signal, overcurrent signal, undervoltage signal, balance signal, or the like derived from the electric power system by the IED 120. An indication from the fault detection module 154 may be used by the protective action implementation module 158 to implement one or more protective actions to mitigate potentially unsafe conditions and damage to an electric power delivery system (e.g., issuing control instructions to trip a breaker and isolate the fault from the system).

The protective action implementation module 158 may be configured to also use information from various CMDs to modify its protective actions, according to various embodiments described herein.

The control module 156 may be configured for interacting with monitored equipment connected to a distributed controller via the monitored equipment interface 136 and/or via the communications interface 144. According to some embodiments, control instructions from the control module 156 may be intended as control instructions for other IEDs and/or monitored equipment located remote to the IED 120. In some cases, control instructions may be only informative or suggestive, meaning that the receiving IED is not obligated to perform the control instruction. Rather, the receiving IED may use the suggested control instruction in coordination with its own determinations and information from other controllers to determine whether it will perform the control instruction. In other cases, control instructions may be directive in that they are required actions. Differentiation between informative or suggestive control instructions and mandatory control instructions may be based on information included with the control instruction.

The communication module 152 may include instructions for facilitating communication of information from the IED 120 to other controllers and/or other components in the electric power delivery system. The communication module 152 may include instructions on the formatting of communications according to a predetermined protocol. The communication module 152 may be configured with subscribers to certain information, and may format message headers according to such subscription information.

The IED 120 may include one or more receivers 160. Each of the one or more of receivers 160 may be in communication with an associated CMD, such as the CMD 101. This communication may be facilitated through a receiver communications interface 162. The receiver communications interface 162 may include an antenna for radio communications, or a receptacle for a wire, or any other communications interface known by those of skill in the art as capable of interfacing with one or more physical media upon which signals are being sent. As indicated above, the IED 120 may be configured to receive communications from multiple CMDs. In such embodiments, each CMD may be associated with a different subset of the receivers 160. As will be described in more detail below, each of the receivers 160 associated with a CMD may be configured to receive communications on different channels, wherein, upon receipt of a communication from said CMD by any of the receivers 160, each of the receivers 160 that are associated with the CMD may increment its communication channel. The one or more receivers 160 may be connected to the processor 142 by way of the data bus 140, through which digitized representations of signals received at the one or more receivers 160 may be transmitted to the processor 142.

FIG. 2A illustrates a timing diagram 200 corresponding to one-way communications of a one-way communication protocol, according to embodiments of the present disclosure. The timing diagram 200 includes the signal timing for a transmitter 202, showing timings of various signals sent by the transmitter 202. The timing diagram 200 further includes indication of received signals for a first receiver 204 and a second receiver 206, and showing the timings of the signals received at the first receiver 204 and the second receiver 206. In some embodiments, the transmitter 202 is included in a transmitting device such as a CMD, and the first receiver 204 and the second receiver 206 are included in a receiving device such as an IED.

The timing diagram 200 illustrates one embodiment of heartbeat signals being transmitted from the transmitter 202. In this case, the transmitter 202 initially sends out a heartbeat signal 214 on channel 4. The transmitter 202 subsequently undergoes a channel change event 222. Throughout this disclosure, a channel change event may refer to the act of configuring a transmitter to transmit signals (send) on a channel other than the one on which it was previously sending. A channel change event may also refer to the act of configuring a receiver to receive signals (listen) on a channel other than the one on which it was previously listening. After this channel change event 222, the transmitter 202 then sends a heartbeat signal 226 on channel 5. The transmitter 202 may then at some later time undergo another channel change event 228. In some embodiments, the transmitter 202 may repeat the same dual heartbeat pattern at a later time using channels 6 and 7 (not shown).

The first receiver 204 initially has been listening for signals on channel 4 during a channel 4 detection period 210. During the channel 4 detection period 210, the channel 4 heartbeat signal 214 that was initially sent by the transmitter 202 is detected 216 over channel 4. This detection 216 is communicated back to the host receiving device which includes the first receiver 204. The first receiver 204 then undergoes a channel change event 218 to receive on channel 6 and enters a channel 6 detection period 230.

The second receiver 206 initially has been listening on channel 5 for signals during a channel 5 detection period 212. During the channel 5 detection period 212, no signals are detected from the transmitter 202. However, when the first receiver 204 undergoes a channel change event 218, the receiving device which includes both the first receiver 204 and the second receiver 206 also instructs the second receiver 206 to undergo a channel change event. In response to this instruction, the second receiver 206 undergoes a channel change event 220 to listen on channel 7 and enters a channel 7 detection period 232.

FIG. 2B illustrates a timing diagram 240 corresponding to one-way communications of a one-way communication protocol, according to various embodiments. The timing diagram 240 includes the signal timing for a transmitter 242, showing timings of various signals sent by the transmitter 242. The timing diagram 240 further includes indication of received signals for a first receiver 244 and a second receiver 246, and showing the timings of the signals received at the first receiver 244 and the second receiver 246. In some embodiments, the transmitter 242 is included in a transmitting device such as a CMD, and the first receiver 244 and the second receiver 246 are included in a receiving device such as an IED.

Timing diagram 240 illustrates one embodiment of a heartbeat signal being transmitted from the transmitter 242. In this case, the transmitter 242 initially sends out a heartbeat signal 252 on channel 4. The transmitter 202 subsequently undergoes a channel change event 256. After this channel change event, the transmitter 242 then sends a heartbeat signal 262 on channel 5. The transmitter 242 may then at some later time undergo another channel change event 268. In some embodiments, the transmitter 242 may repeat the same dual heartbeat pattern at a later time using channels 6 and 7 (not shown).

The first receiver 244 initially has been listening for signals on channel 4 during a channel 4 detection period 250. During the channel 4 detection period 250, no heartbeat signals are detected on channel 4 (even though the transmitter 242 sent such a heartbeat signal 252). This may be because of some disruption or interference with the signal as already herein described.

Instead, the second receiver 246 receives or otherwise detects 260 the channel 5 heartbeat signal 262 that was sent by the transmitter 242. This detection 260 is communicated back to the host receiving device which includes the second receiver 246. The second receiver 246 then immediately undergoes a channel change event 264 and enters a channel 7 detection period 272.

In response to receiving communication that a channel 5 heartbeat has been detected 260 by the second receiver 246, the host receiving device (which is in communication with the first receiver 244 and the second receiver 246) instructs the first receiver 244 to undergo a channel change event. In response to this instruction, the first receiver 244 undergoes a channel change event 266 and enters a channel 6 detection period 270.

The signaling embodiments illustrated by FIGS. 2A and 2B demonstrate the robustness of using multiple receivers in an implementation of a one-way communication protocol, according to some embodiments of the present disclosure. Should a first receiver in either embodiment not receive the heartbeat signal, there is still a chance that a second receiver will receive the heartbeat signal. This combination of a transmitter sending a signal on two distinct channels and two receivers listening on two distinct channels provides an improvement of the robustness and reliability of the communication of a heartbeat message through the system generally. Simultaneously using multiple receivers in communication with the same host receiving device (such as, e.g., an IED) further addresses synchronization concerns raised above. Because both receivers are in communication with the same host receiving device, they can be alerted to any signal received at the other receiver. Assuming that at least one receiver receives a heartbeat signal sent by the transmitter, each receiver will end up with information corresponding to the current state of the transmitter and the other receiver(s) (at least implicitly). In this way, all receivers can remain "in-sync" as they step through the channels of a hopping sequence corresponding to a given one-way communication protocol.

FIG. 3A illustrates a timing diagram 300 corresponding to one-way communications of a one-way communication protocol, according to embodiments of the present disclosure. The timing diagram 300 includes the signal timing for a transmitter 302, showing timings of various signals sent by the transmitter 302. The timing diagram 300 further includes indication of received signals for a first receiver 304 and a second receiver 306, and shows the timings of signals received at the first receiver 304 and the second receiver 306. In some embodiments, the transmitter 302 is included in a transmitting device such as a CMD, and the first receiver 304 and the second receiver 306 are included in a receiving device such as an IED.

The timing diagram 300 illustrates a fault message being transmitted from the transmitter 302. In this case, the transmitter 302 initially sends out a fault signal 314 on channel 4. The transmitter 302 then repeats the transmission of the fault message (e.g., a fault signal 320) on channel 4. The transmitter 302 subsequently undergoes a channel change event 322. After this channel change event 322, the transmitter 302 then sends the fault message via a fault signal 330 on channel 5. The transmitter 302 then repeats the transmission of the fault message via a fault signal 334 on channel 5. The transmitter 302 may then at some later time undergo another channel change event 336. In some embodiments, the transmitter 302 may repeat the same dual fault signal pattern at a later time using channels 6 and 7 (not shown).

The first receiver 304 initially has been listening for signals during a channel 4 detection period 310. During the channel 4 detection period 310, the first channel 4 fault signal 314 that was initially sent by the transmitter 302 is detected 316 or otherwise received over channel 4. This detection 316 is communicated back to the host receiving device which is in communication with the receiver 304. The receiver 304 then undergoes a channel change event 318 and enters a channel 6 detection period 324.

The second receiver 306 initially has been listening on channel 5 for signals during a channel 5 detection period 312. During the channel 5 detection period 312, no signals are detected from the transmitter 302. However, when the first receiver 304 undergoes the channel change event 318, the receiving device which includes both the first receiver 304 and the second receiver 306 instructs the second receiver 306 to undergo a channel change event 328. In response to this instruction, the second receiver 306 undergoes the channel change event 328 and enters a channel 7 detection period 326.

The timing diagram 300 of FIG. 3A illustrates one embodiment of a one-way communication protocol in which a fault message is transmitted by a transmitter 302 across a pair of channels (e.g., via fault signals 314, 320, 330, 334). If the message is received by one of a first receiver 304 receiving on the first communication channel (e.g., channel 4) and a second receiver 306 receiving on the second communication channel (e.g., channel 5), the first receiver 304 is configured to change channels according to a predetermined channel hopping sequence to receive messages across a third communication channel (e.g., channel 6). Similarly, if the message is received by one of the first receiver 304 receiving on the first communication channel (e.g., channel 4) and the second receiver 306 receiving on the second communication channel (e.g., channel 5), the second receiver 306 may be configured to change channels according to a predetermined channel hopping sequence to receive messages across a fourth communication channel (e.g., channel 7).

FIG. 3B illustrates a timing diagram 340 corresponding to one-way communications of a one-way communication protocol, according to embodiments of the present disclosure. The timing diagram 340 includes the signal timing for a transmitter 342, showing timings of various signals sent by the transmitter 342. The timing diagram 340 further includes indication of received signal timings for a first receiver 344 and a second receiver 346, showing the timings of signals received at the first receiver 344 and the second receiver 346. In some embodiments, the transmitter 342 is included in a transmitting device such as a CMD, and the first receiver 344 and the second receiver 346 are included in a receiving device such as an IED.

The timing diagram 340 illustrates a fault message being transmitted from the transmitter 342. In this case, the transmitter 342 initially sends out a fault signal 348 on channel 4. The transmitter 342 then repeats the transmission of the fault message (e.g., a fault signal 350) on channel 4. The transmitter 342 subsequently undergoes a channel change event 352. After this channel change event 352, the transmitter 342 then sends the fault message via a fault signal 358 on channel 5. The transmitter 342 then repeats the transmission of the fault message via a fault signal 360 on channel 5. The transmitter 342 may then at some later time undergo another channel change event 362. In some embodiments, the transmitter 342 may repeat the same dual fault signal pattern at a later time using channels 6 and 7 (not shown).

The first receiver 344 initially has been listening for signals during a channel 4 detection period 356. During the channel 4 detection period 356, no fault signals are detected on channel 4 (even though the transmitter 342 sent such a signal). This may be because of some disruption or interference with the signal as already herein described.

Instead, the second fault signal 360 that was sent by the transmitter 342 is detected 364 or otherwise received over channel 5. This detection 364 is communicated back to the host receiving device which includes the second receiver 346. The second receiver 346 then immediately undergoes a channel change event 368 and enters a channel 7 detection period 372.

In response to receiving communication that a channel 5 fault signal has been detected by the second receiver 346, the host receiving device (which is in communication with the first receiver 344 and the second receiver 346) instructs the first receiver 344 to undergo a channel change event. In response to this instruction, the first receiver 344 undergoes a channel change event 366 and enters a channel 6 detection period 370.

The embodiments of FIGS. 3A and 3B demonstrate a receiver sending a signal multiple times on the same channel before undergoing a channel change event (e.g., the fault signals 314 and 320 occurring before the channel change event 322). Throughout this specification, the repetition of sending data more than once across the same channel (two or more transmissions in a row) may be referred to as a multiple sending scheme. A multiple sending scheme may be desirable in some embodiments to further increase the probability that the sent signals are received by a corresponding receiver listening on the associated channel. In some embodiments, it may be that only high priority signals, such as fault signals, are sent multiple times on the same channel, while low priority signals, such as heartbeat signals, may be sent only fewer times (or perhaps only once) on a given channel. This differentiation based on priority may be to save power by multiple sending of only higher priority messages.

Similarly to the discussion above in relation to FIGS. 2A and 2B, the signaling embodiments illustrated by FIGS. 3A and 3B demonstrate the robustness of using multiple receivers in an implementation of a one-way protocol according to some embodiments of the present disclosure. Should a receiver listening on a channel upon which was sent the first fault (and any possible repeated sends) not receive any of these (possibly multiple) broadcasts on the corresponding channel, there is still a chance that a second receiver will receive a signal (or its possible repetition) on a second channel. This combination of a transmitter sending (possibly repeated) signal(s) on two distinct channels and two receivers listening on two distinct channels provides an improvement of the robustness and reliability of the communication of a message by a one-way communication protocol and through the system generally. Using multiple receivers in communication with the same host receiving device (such as, e.g., an IED) simultaneously further addresses synchronization concerns raised above. Because both receivers are in communication with the same host receiving device, they can be alerted to any signal received at the other receiver. Assuming that at least one receiver receives any fault signal sent by a transmitter, each receiver will end up with information corresponding to the current state of the transmitter and the other receiver(s) (at least implicitly). In this way, all receivers can remain "in-sync" as they step through the channels of a hopping sequence corresponding to a given one-way communication protocol.

FIGS. 3A and 3B show only a pair of many possible embodiments that use a multiple sending scheme. For example, other embodiments according to these figures may have the first receiver 344 successfully receiving a channel 4 fault signal corresponding to the fault signal 350 sent by the transmitter 342. Channel change events would have then occurred subsequent to this reception in the manner described above.

Still other embodiments may include the second receiver 346 successfully receiving a channel 5 fault signal corresponding to the fault signal 358 sent by the transmitter 342. Channel change events would then occur subsequent to this reception in the manner described above.

The embodiments of FIGS. 2 and 3 (and further FIGS. throughout) may include transmitters and receivers that are programmed to transmit or listen (receive), as appropriate, on substantially similar timing cycles, with channel change events between each device having substantially the same periodicity. This may be important for, among other things, re-establishing system communication in the event of a communication error, as will be discussed further below.

The embodiments of FIGS. 2 and 3 (and further FIGS. throughout) illustrate the use of a pair of receivers corresponding to a transmitter. The use of three, four, or any other number of receivers corresponding to one or more transmitters is contemplated as well. The use of even more receivers with one transmitter would, for example, further alleviate signal reception and synchronization concerns in the manner described above by providing another chance to detect a signal on third, fourth, etc. communication channel(s). Additional channel change events and signaling would be applied to the transmitters of these embodiments to correspond to each of the three, four, or more receivers.

Figure 4:
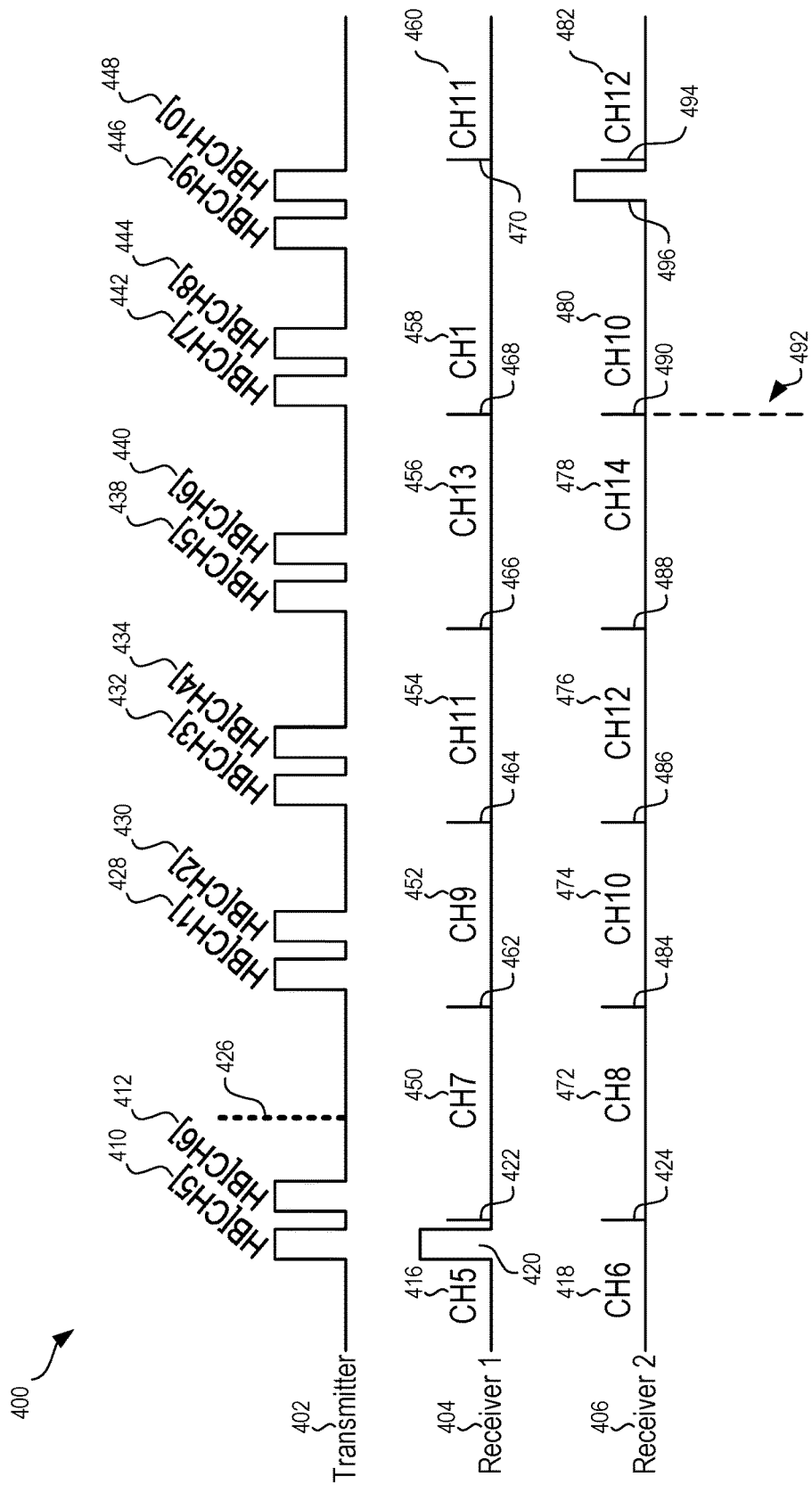
FIG. 4 illustrates timing diagrams corresponding to a first communication error recovery method used during one-way communications, according to various embodiments of the present disclosure.

FIG. 4 illustrates a timing diagram 400 corresponding to one-way communications of a one-way communication protocol, according to embodiments of the present disclosure. The timing diagram 400 includes the signal timing for a transmitter 402, showing timings of various signals sent by the transmitter 402. The timing diagram 400 further includes received signal timings for a first receiver 404 and a second receiver 406, showing the timings of signals received at the first receivers 404 and the second receiver 406. In some embodiments, the transmitter 402 is included in a transmitting device such as a CMD, and the first receiver 404 and the second receiver 406 are included in a receiving device such as an IED.

The timing diagram 400 illustrates one embodiment of a recovery of system communication from a communication error caused by the temporary power-down of the transmitter 402. In some embodiments, the transmitter 402 is transmitting heartbeat signals to the first receiver 404 and the second receiver 406. In some embodiments, this transmission proceeds in the manner described in relation to FIGS. 2A and 2B above. In the embodiment of FIG. 4, the transmitter 402 sent out a heartbeat signal 410 on channel 5 and a heartbeat signal 412 on channel 6. The first receiver 404 detects 420 the channel 5 heartbeat signal 410 during a channel 5 detection period 416. In response, the first receiver 404 undergoes a channel change event 422 and begins a channel 7 detection period 450 and the second receiver 406, which is in communication with the first receiver 404 (at least indirectly, for example through a host receiving device corresponding to both the first receiver 404 and the second receiver 406), undergoes a channel change event 424 and begins a channel 8 detection period 472.

The transmitter 402 then goes through a temporary power-down event 426. This power-down event 426 may be in response to some fault on the conductor upon which a host transmitting device corresponding to the transmitter 402 draws its power. A more specific example of this may be if a CMD monitoring and drawing power from a conductor powers down due to a brief loss of power on said conductor. Alternatively, a brief power-down event could be due to a brief interruption of power that is being supplied to the transmitter 402 in ways other than as a supply from a corresponding conductor-powered transmitting device.

The transmitter 402 may regain power after the temporary power-down event 426. The transmitter 402 may then simply begin cycling through a predetermined channel order (e.g., a hopping sequence). In some embodiments, such as the one illustrated in FIG. 4, the transmitter 402 may simply begin at the beginning of the predetermined channel order (as illustrated by the channel 1 heartbeat 428 subsequent to the temporary power-down event 426). This may be, in part, because there is no way for the first receiver 404 or the second receiver 406 to communicate back to the transmitter 402 their current location in the predetermined channel order. The choice to have the transmitter 402 begin again at the beginning following a power outage on the transmitter 402 has advantages that will be discussed below. Other embodiments may be designed to simply have the transmitter 402 resume transmitting on the channels corresponding to the next channels that would have been utilized should the transmitter 402 have never lost power. Still other embodiments may begin with the transmitter 402 transmitting on randomly chosen channels (but still corresponding to a predetermined channel order) after a temporary power-down event.

In the embodiment of FIG. 4, after the transmitter 402 regains power, it begins transmitting heartbeat signals from the beginning of the predetermined channel order as represented by the heartbeats on channels 1, 2, etc. represented by the heartbeat signals 428, 430, 432, 434, 438, 440, 442, 444, 446, 448 following the temporary power-down event 426. There is a period of time after the temporary power-down event 426 where no heartbeat signal is detected by either the first receiver 404 or the second receiver 406. In the embodiment of FIG. 4, the first receiver 404 and the second receiver 406 are configured to continue to cycle through their various channel detection periods. In some embodiments, this cycle occurs on each receiver in a substantially periodic manner. This period may be pre-programmed, and may be measured from the last successful transmission received from the transmitter 402 or from the last channel change event experienced by one or both of the receivers 404, 406. The cycle continuation is shown in FIG. 4 by the various channel detection periods without a detection 450, 452, 454, 456 corresponding to the first receiver 404 and the various channel detection periods without a detection 472, 474, 476, 478 corresponding to the second receiver 406. Note that between each channel detection period is a channel change event (with some channel change events 462, 464, 466 corresponding to the first receiver 404 and some channel change events 484, 486, 488 corresponding to the second receiver 406).

In some embodiments, the first receiver 404 and the second receiver 406 (or alternatively, a host receiving device corresponding to the first receiver 404 and the second receiver 406) may determine that a communication error has occurred after a certain number of channel detection periods have passed without the successful reception of a signal sent by the transmitter 402 on either the first receiver 404 or the second receiver 406. In response to this determination, the first receiver 404 and the second receiver 406 may be configured to default to a predetermined set of channels. In embodiments according to FIG. 4, the first receiver 404 and the second receiver 406 undergo a default channel event 492 during which the first receiver 404 defaults to a channel 1 detection period 458 and the second receiver 406 defaults to a channel 10 detection period 480 once four detection periods have passed without either receiver 404, 406 receiving a message from the transmitter 402.

The selection of channels 1 and 10 may be predetermined or otherwise deliberate. For example, the selection of at least channel 10 may reflect the understanding that it is possible that a temporary power-down event may be of a relatively short duration. The selection of channel 10 as one of the default channels may thus reflect the recognition that the transmitter 402 may have regained power before four transmission periods have passed without a successful detection event by the first receiver or the second receiver. In FIG. 4, the transmitter 402 has begun transmitting through the signal order again within this time period. In cases such as this, the selection of channel 10 may reflect the case where the transmitter 402 already sent a heartbeat 428 on channel 1 prior to the default channel event 492 and has since continued to cycle through the predetermined channel order. In these cases, the selection of channel 10 may reflect the understanding that even if the transmitter 402 had immediately regained power subsequent to the temporary power-down event 426 and begun cycling through the signal order, it would not have yet reached channel 10 by the time the default channel event 492 occurs on the first receiver 404 and the second receiver 406 after four transmission periods. The use of four transmission periods to determine a communication error in this manner may be called a four transmission period error determination scheme. Other numbers of transmission period error schemes are possible (e.g., a three, five, or one transmission period error determination scheme).

During the default channel event 492, the first receiver 404 defaults to a channel 1 detection period 458 (after the fourth detection period 456 since the last detection from the transmitter 402) by means of a channel change event 468. During the default channel event 492, the second receiver 406 defaults to a channel 10 detection period 480 (after the fourth detection period 478 since the last detection from the transmitter 402) by means of a channel change event 490. Some time after the first receiver 404 and the second receiver 406 have returned to these default channels, the channel 10 heartbeat that was sent by the transmitter 402 is detected by the second receiver 406 during its channel 10 detection period 480.

The first receiver 404 and the second receiver 406 may then undergo a pair of channel change events 470 and 494, such as described previously. Since the channel 10 heartbeat 448 was detected 496 by the second receiver 406 during a channel 10 detection period 480, the second receiver 406 advances to a channel 12 detection period 482. In some embodiments, the first receiver 404 and the second receiver 406 may be in communication with each other (perhaps through a shared host receiving device such as an IED). Accordingly, the second receiver 406 may communicate with the first receiver 404 (by means of the shared host) that a channel 10 detection 496 was registered. The first receiver 404 may be configured to respond by advancing to a channel 11 detection period 460 rather than, e.g., a channel 3 detection period. The transmitter 402, the first receiver 404, and the second receiver 406 may at this point now be said to have recovered from the communication error caused by the temporary power-down event 426 on the transmitter 402. They may now be able to continue according to the embodiments disclosed in relation to the discussions of FIGS. 2A, 2B, 3A, and/or 3B.

Figure 5:
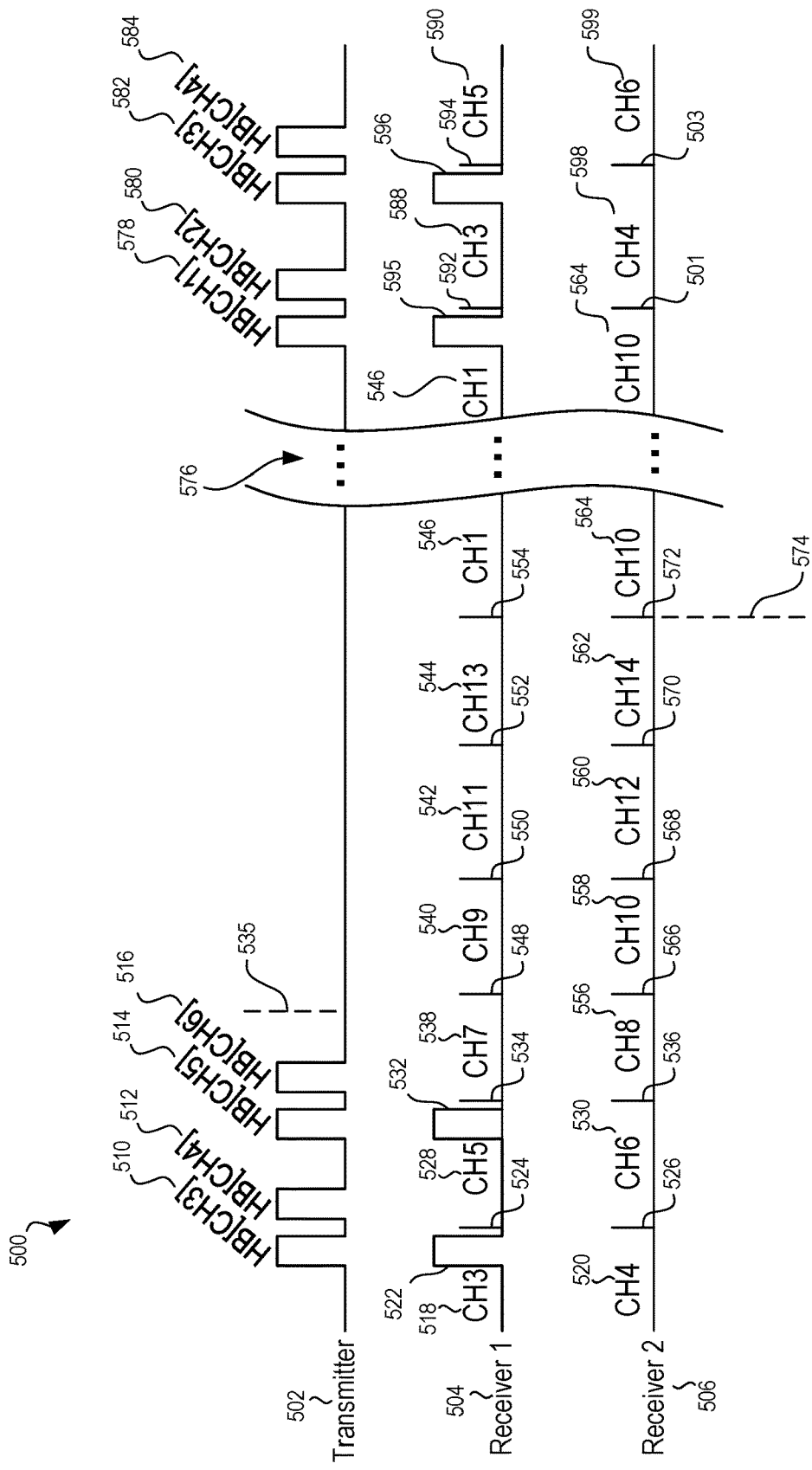
FIG. 5 illustrates timing diagrams corresponding to a second communication error recovery method used during one-way communications, according to various embodiments of the present disclosure.

FIG. 5 illustrates a timing diagram 500 corresponding to one-way communications of a one-way communication protocol, according to various embodiments. The timing diagram 500 includes the signal timing for a transmitter 502, showing timings of various signals sent by the transmitter 502. The timing diagram 500 further includes received signal timings for a first receiver 504 and a second receiver 506, showing the timings of signals received at the first receiver 504 and the second receiver 506. In some embodiments, the transmitter 502 is included in a transmitting device such as a CMD, and the first receiver 504 and the second receiver 506 are included in a receiving device such as an IED.

The timing diagram 500 illustrates one embodiment of a recovery of system communication from a communication error caused by a temporary power-down of the transmitter 502. In some embodiments, the transmitter 502 is transmitting heartbeat signals to the first receiver 504 and the second receiver 506. In some embodiments, this transmission proceeds in the manner described in relation to FIGS. 2A, 2B, 3A, and/or 3B discussed above. In the embodiment of FIG. 5, the transmitter 502 has sent out a heartbeat signal 510 on channel 3 and a heartbeat signal 512 on channel 4. The first receiver 504 detects 522 the channel 3 heartbeat signal during a channel 3 detection period 518. In response, the first receiver 504 undergoes a channel change event 524 and begins a channel 5 detection period 528 and the second receiver 506, which may be in communication with the first receiver 504 (at least indirectly, for example through a host receiving device corresponding to both the first receiver 504 and the second receiver 506), undergoes a channel change event 526 and begins a channel 6 detection period 530.

Continuing in a heartbeat style transmission pattern, the transmitter 502 at some later point sends out a heartbeat signal 514 on channel 5 and a heartbeat signal 516 on channel 6. The receiver 504 detects 532 the channel 5 heartbeat signal 514 during the channel 5 detection period 528. In response, the first receiver 504 undergoes a channel change event 534 and begins a channel 7 detection period 538 and the second receiver 506, which may be in communication with the first receiver 504 (at least indirectly, for example through a host receiving device corresponding to both the first receiver 504 and the second receiver 506), undergoes a channel change event 536 and begins a channel 8 detection period 556.

The transmitter 502 then goes through a temporary power-down event 535. This temporary power-down event 535 may be in response to some fault on the conductor upon which a host transmitting device corresponding to the transmitter 502 draws its power. A more specific example of this would be if a CMD monitoring and drawing power from a conductor powers down due to a loss of power on said conductor. Alternatively, a power-down event could be due to an interruption of power that is being supplied to the transmitter 502 in ways other than as a supply from a corresponding conductor-powered transmitting device.

The transmitter 502 may regain power after the temporary power-down event 535. The transmitter 502 may then simply begin cycling through a predetermined channel order. In some embodiments, such as illustrated in FIG. 5, the transmitter 502 may simply begin at the beginning of the predetermined channel order (as illustrated by the channel 1 heartbeat signal 578 subsequent to the temporary power-down event 535). This may be, in part, because there is no way for the first receiver 504 or the second receiver 506 to communicate back to the transmitter 502 their current location in the predetermined channel order. A choice to begin again at the beginning following a power outage on the transmitter 502 has advantages that will be discussed below. Other embodiments may be designed to simply have the transmitter 502 resume transmitting on the channels corresponding to the next channels that would have been utilized should the transmitter 502 have never lost power. Still other embodiments may begin with the transmitter 502 transmitting on randomly chosen channels (but still corresponding to a predetermined channel order) after a temporary power-down event.

In the embodiment of FIG. 5, after the transmitter 502 regains power, it begins transmitting heartbeat signals from the beginning of the predetermined channel order as represented by the heartbeats on channels 1, 2, etc. represented by the heartbeat signals 578, 580, 582, 584 following the temporary power-down event 535. There is a period of time after the temporary power-down event 535 where no heartbeat signal is detected by either the first receiver 504 or the second receiver 506. In the embodiment of FIG. 5, the first receiver 504 and the second receiver 506 are configured to continue to cycle through their various channel detection periods. In some embodiments, this cycle occurs on each receiver in a substantially periodic manner. This period may be pre-programmed, and may be determined from the last successful transmission received from the transmitter 502. The cycle continuation is shown in FIG. 5 includes various channel detection periods without a detection 538, 540, 542, 544 corresponding to the first receiver 504 and various channel detection periods without a detection 556, 558, 560, 562 corresponding to the second receiver 506. Note that between each channel detection period is a channel change event (with some channel events 548, 550, 552 corresponding to the first receiver 504 and some channel change events 566, 568, 570 corresponding to the second receiver 506).

In some embodiments, the first receiver 504 and the second receiver 506 (or alternatively, a host receiving device corresponding to the first receiver 504 and the second receiver 506) may determine that a communication error has occurred after a certain number of channel detection periods have passed without the successful reception of a signal sent by the transmitter 502 on either the first receiver 504 or the second receiver 506. In response to this determination, the first receiver 504 and the second receiver 506 may be configured to default to a pre-determined set of channels. In the embodiment of FIG. 5, the first receiver 504 and the second receiver 506 undergo a default channel event 574 during which the first receiver 504 defaults to a channel 1 detection period 546 and the second receiver 506 defaults to a channel 10 detection period 564 upon the passage of four detection periods without either receiver 504, 506 receiving a message from the transmitter 502.

The selection of channels 1 and 10 may be deliberate. For example, the selection of at least channel 1 may reflect an understanding that it is possible that a temporary power-down event may be of a relatively long duration. The selection of channel 1 as one of the default channels may thus reflect the understanding that the transmitter 502 may have regained power after four transmission periods have passed without a successful detection event by the first receiver 504 or the second receiver 506. The selection of channel 1 as one of the default channels may thus reflect a recognition that the transmitter 502 may have sustained a power loss until some amount of time after the receivers 504, 506 determine that four consecutive channel detection periods have passed without receiving any transmission from transmitter 502 and that channel 1 may be the first channel used by the transmitter 502 when the temporary power-down event ends.

During the default channel event 574, the first receiver 504 defaults to a channel 1 detection period 546 (after the fourth detection period 544 since the last detection from the transmitter 502) by means of a channel change event 554. During the default channel event 574, the second receiver 506 defaults to a channel 10 detection period 564 (after the fourth detection period 562 since the last detection from the transmitter 502) by means of a channel change event 572. The first receiver 504 and the second receiver 506 may remain listening on these default channels until another signal from transmitter 502 is received after an indeterminate period of time 576. In the embodiment of FIG. 5, the channel 1 heartbeat signal 578 that was sent by transmitter 502 at some point after the indeterminate period of time 576 is detected 595 by the first receiver 504 during a channel 1 detection period 546.

The first receiver 504 and the second receiver 506 may then undergo a pair of channel change events 592 and 501 corresponding to embodiments disclosed above. Since the channel 1 heartbeat signal 578 was detected by the first receiver 504 during a channel 1 detection period 546, the first receiver 504 advances to a channel 3 detection period 588. In some embodiments, the first receiver 504 and the second receiver 506 may be in communication with each other (perhaps through a shared host receiving device such as an IED). Because of this, the first receiver 504 may be able to communicate to the second receiver 506 that a channel 1 detection 595 was registered. The second receiver 506 may be configured to respond by advancing to a channel 4 detection period 598 rather than, e.g., a channel 12 detection period. The transmitter 502, the first receiver 504, and the second receiver 506 may at this point now be said to have recovered from the communication error caused by the temporary power-down event 535 on the transmitter 502. They may now be ready to continue according to the embodiments disclosed in relation to the discussions of FIGS. 2A, 2B, 3A, and 3B (as shown by the transmitted heartbeat signals 582, 584 subsequent to this recovery, the heartbeat detection 596 subsequent to this recovery, the channel change events 594, 503 subsequent to this recovery, and the new channel detection periods 590, 599 subsequent to this recovery).

In the foregoing description, the use of default channels (such as channels 1 and 10) after the passing of four detection periods without successful reception of a signal from a transmitter is given by way of example and not by way of limitation. For example, a system using a three transmission period error determination scheme could instead default to detection periods on channels 1 and 8 instead (the expectation being that after three detection periods pass without reception that channel 8 is likely to be used soon according to, e.g., a modified embodiment according to FIG. 4). Additionally, the use of more than two receivers would further alter which channels would be most likely to be used next by a transmitter after any given transmission period error determination scheme. A system with three transmitters, for example, might default to channel detection periods on channels 1, 7, and 8 respectively, assuming a two transmission period error determination scheme according to a modified embodiment of FIG. 4. Other possible embodiments of receiver population and all numbers of transmission period error determination schemes are contemplated by this disclosure.

The use of a heartbeat signal in embodiments described above in relation to FIGS. 4 and 5 is used by way of example and not by way of limitation. Other signals and signal patterns (including the heartbeat and/or fault signal patterns demonstrated in FIGS. 2A, 2B, 3A, and 3B, and other multiple sending scheme embodiments discussed herein) may be incorporated into these embodiments on the same described principles.

Figure 6:
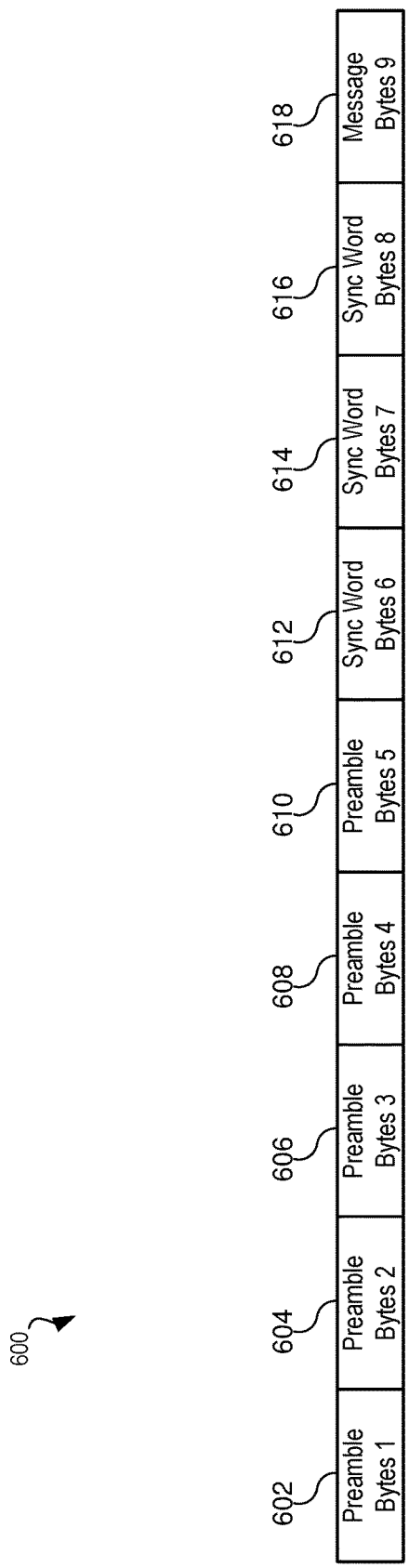
FIG. 6 illustrates a data format that may be used to send data by a transmitter to a receiver, according to some embodiments.

FIG. 6 illustrates a data format 600 that may be used to send data by a transmitter to a receiver, according to some embodiments. A message sent from a transmitter to a receiver may be divided into a number of bytes. Each byte may be an individual piece of data for the corresponding receiver. In other embodiments, multiple bytes (whether grouped up or separately allocated within the data frame) may represent a single piece of data for the receiver. In still other embodiments, the data for the corresponding receiver may only be represented in part of one byte or only parts of multiple bytes.

FIG. 6 illustrates a data format 600 corresponding to some possible embodiments. A message may consist of nine bytes 602, 604, 606, 608, 610, 612, 614, 616, 618. The format of this message may be five preamble bytes 602, 604, 606, 608, 610; three Sync Word bytes 612, 614, 616; and one message byte 618. The preamble bytes may consist of 0x55555h or 0xAAAAAh. The sync word may be a 24-bit Golay code word. The message may be a 1-byte long Hamming (7,4) code with an extra parity bit.

Figure 7:
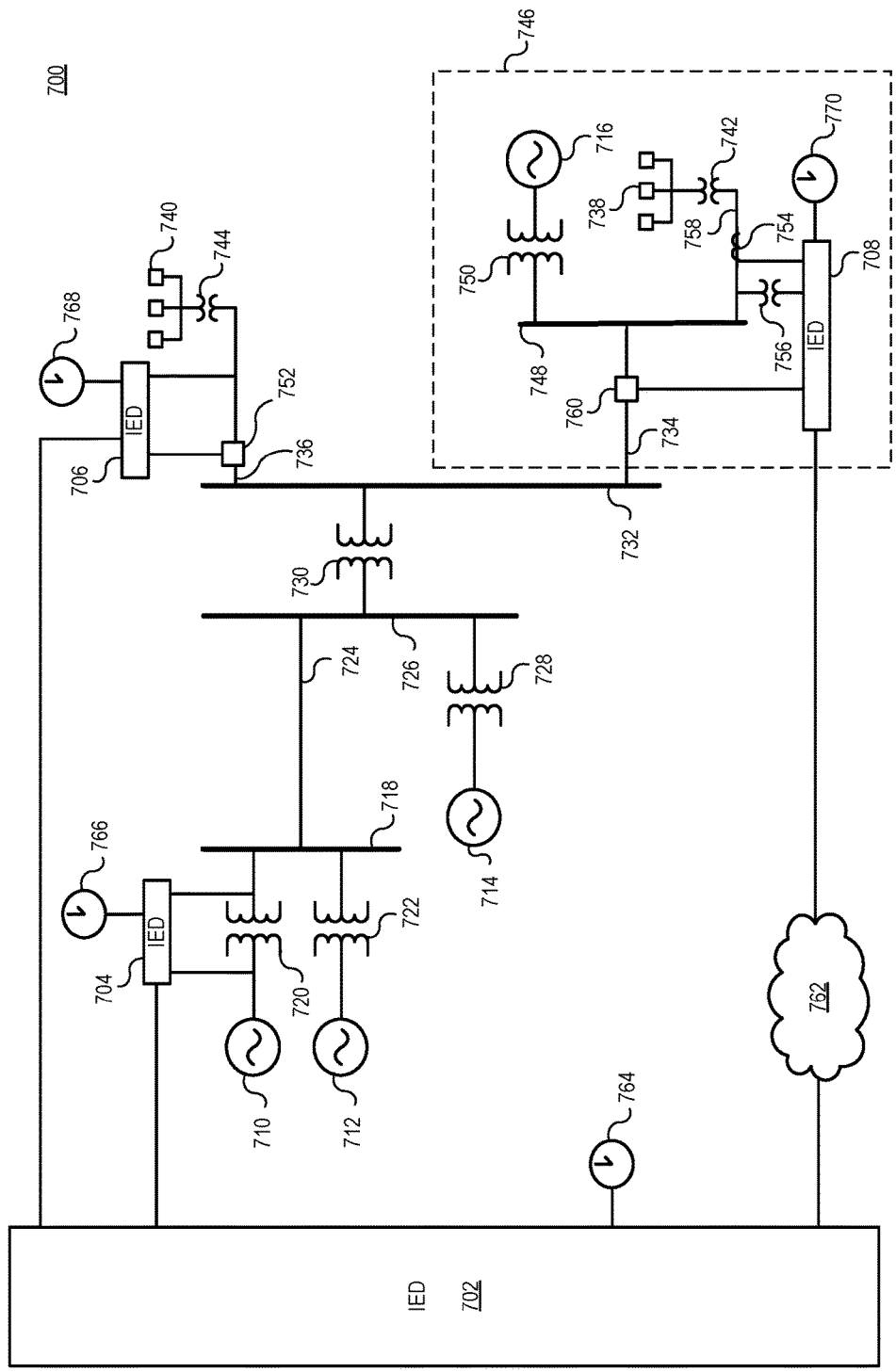
FIG. 7 illustrates a simplified diagram of one embodiment of an electric power delivery system that includes intelligent electronic devices consistent with embodiments disclosed herein.

FIG. 7 illustrates a simplified diagram of an electric power generation and delivery system 700 that includes various IEDs 702-708 consistent with embodiments disclosed herein. Although illustrated as a one-line diagram for purposes of simplicity, the electrical power generation and delivery system 700 may also be configured as a three-phase power system. Moreover, embodiments disclosed herein may be utilized by any electric power generation and delivery system and is therefore not limited to the specific system 700 illustrated in FIG. 7. Accordingly, embodiments may be integrated, for example, in industrial plant power generation and delivery systems, deep-water vessel power generation and delivery systems, ship power generation and delivery systems, distributed generation power generation and delivery systems, utility electric power generation and delivery systems, and the like.

The electric power generation and delivery system 700 may include generation, transmission, distribution, and power consumption equipment. For example, the system 700 may include one or more generators 710-716 that, in some embodiments, may be operated by a utility provider for generation of electrical power for the system 700. Generators 710 and 712 may be coupled to a first transmission bus 718 via one or more step up transformers 720 and 722, which are respectively configured to step up the voltages provided to the first transmission bus 718. A transmission line 724 may be coupled between the first transmission bus 718 and a second transmission bus 726. Another generator 714 may be coupled to the second transmission bus 726 via a step-up transformer 728 which is configured to step up the voltage provided to the second transmission bus 726.

A step-down transformer 730 may be coupled between the second transmission bus 726 and a distribution bus 732 configured to step down the voltage provided by the second transmission bus 726 at transmission levels to lower distribution levels at the distribution bus 732. One or more feeders 734, 736 may draw power from the distribution bus 732. The feeders 734, 736 may distribute electric power to one or more loads 738, 740. In some embodiments, the electric power delivered to the loads 738, 740 may be further stepped down from distribution levels to load levels via one or more step down transformers 742 and 744.

Feeder 734 may feed electric power from the distribution bus 732 to a distribution site 746 (e.g., a refinery, smelter, paper production mill, or the like). Feeder 734 may be coupled to a distribution site bus 748. The distribution site 746 may also include a distributed generator 716 configured to provide power to the distribution site bus 748 at an appropriate level via a transformer 750. The distribution site 746 may further include one or more loads 738. In some embodiments, the power provided to the loads 738 from the distribution site bus 748 may be stepped up or stepped down to an appropriate level via the transformer 742. In certain embodiments, the distribution site 746 may be capable of providing sufficient power to the loads 738 independently by the distributed generator 716, may utilize power from generators 710-714, or may utilize both the distributed generator 716 and one or more of generators 710-714 to provide electric power to the loads 738.

IEDs 702-708 may be configured to control, monitor, protect, and/or automate the electric power generation and delivery system 700. As used herein, an IED may refer to any processor-based device (e.g., a microprocessor-based device) that monitors, controls, automates, and/or protects monitored equipment within an electric power system. In some embodiments, IEDs 702-708 may gather status information from one or more pieces of monitored equipment. Further, IEDs 702-708 may receive information concerning monitored equipment using sensors, transducers, actuators, and the like. Although FIG. 7 illustrates separate IEDs monitoring a signal (e.g., IED 704) and controlling a breaker (e.g., IED 708), these capabilities may be combined into a single IED.

FIG. 7 illustrates various IEDs 702-708 performing various functions for illustrative purposes and does not imply any specific arrangements or functions required of any particular IED. In some embodiments, IEDs 702-708 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. For example, IEDs 702-708 may be configured to monitor and communicate information relating to overcurrent and/or interharmonic and/or other signal conditions of a monitored line (e.g., a feeder and/or transmission line). Further, IEDs 702-708 may be configured to communicate calculations, such as phasors (which may or may not be synchronized as synchrophasors), events, fault distances, differentials, impedances, reactances, frequency, and the like. IEDs 702-708 may also communicate settings information, IED identification information, communications information, status information, alarm information, and the like. Information of the types listed above, or more generally, information about the status of monitored equipment, may be generally referred to herein as monitored system data.

In certain embodiments, IEDs 702-708 may issue control instructions to the monitored equipment in order to control various aspects relating to the monitored equipment. For example, an IED (e.g., IED 706) may be in communication with a circuit breaker (e.g., breaker 752), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

The distribution site 746 may include an IED 708 for monitoring, controlling, and protecting the equipment of the distribution site 746 (e.g., generator 716, transformer 742, etc.). IED 708 may receive monitored system data, including current signals, via current transformer (CT) 754 and voltage signals via potential transformer (PT) 756 from one or more locations (e.g., line 758) in the distribution site 746. The IED 708 may further be in communication with a breaker 760 coupled between feeder 734 and the distribution site bus 748. In certain embodiments, the IED 708 may be configurable to cause the breaker 760 to disconnect the distribution site bus 748 from the distribution bus 732, based on monitored system data received via CT 754 and PT 756.

Feeder 736 may be communicatively coupled with an IED 706. The IED 706 may be configured to control a breaker 752 between the loads 740 and the distribution bus 732 based on monitored system data. In some embodiments, the power provided to the loads 740 from the distribution bus 732 may be stepped up or stepped down to an appropriate level via the transformer 744. Like the IED 708 of the distribution site 746, monitored system data may be obtained by the IED 706 using CTs and/or PTs (not shown).

Other IEDs (e.g., IED 704) may be configured to monitor, control, and/or protect the electric power generation and delivery system 700. For example, IED 704 may provide transformer and generator protection to the step-up transformer 720 and generator 710. In some embodiments, IEDs 704-708 may be in communication with another IED 702, which may be a central controller, synchrophasor vector processor, automation controller, programmable logic controller (PLC), real-time automation controller, Supervisory Control and Data Acquisition (SCADA) system, or the like. In certain embodiments, IED 702 may be a real-time automation controller, such as is described in U.S. Patent Application Publication No. 2009/0254655, which is incorporated herein by reference in its entirety. The IED 702 may also be a PLC or any similar device capable of receiving communications from other IEDs and processing the communications therefrom. In certain embodiments, IEDs 704-708 may communicate with IED 702 directly or via a communications network (e.g., network 762).

The central IED 702 may communicate with other IEDs 704-708 to provide control and monitoring of the other IEDs 704-708 and the electric power generation and delivery system 700 as a whole. In some embodiments, IEDs 704-708 may be configured to generate monitored system data in the form of time-synchronized phasors (synchrophasors) of monitored currents and/or voltages. In some embodiments, synchrophasor measurements and communications may comply with the IEC C37.118 protocol. In certain embodiments, IEDs 702-708 may receive common time signals for synchronizing collected data (e.g., by applying time stamps for the like). Accordingly, IEDs 702-708 may receive common time signals from time references 764-770 respectively. In some embodiments, the common time signals may be provided using a GNSS derived time signal, a common radio signal such as WWV or WWVB, a network time signal such as IEEE 1588, or the like.

Consistent with embodiments disclosed herein, IEDs 702-708 may be configured to detect and/or identify one or more events from monitored system data. For example, IEDs 702-708 may be configured to receive current information and/or measurements (e.g., current measurements of a transmission and/or a feeder line) and, based on the current information and/or measurements, detect and/or identify fault events.

Consistent with embodiments disclosed herein, a plurality of IEDs 702-708 may be utilized to detect events and implement suitable protective actions to mitigate potentially unsafe conditions and damage to the electric power generation and delivery system 700.

Figure 8:
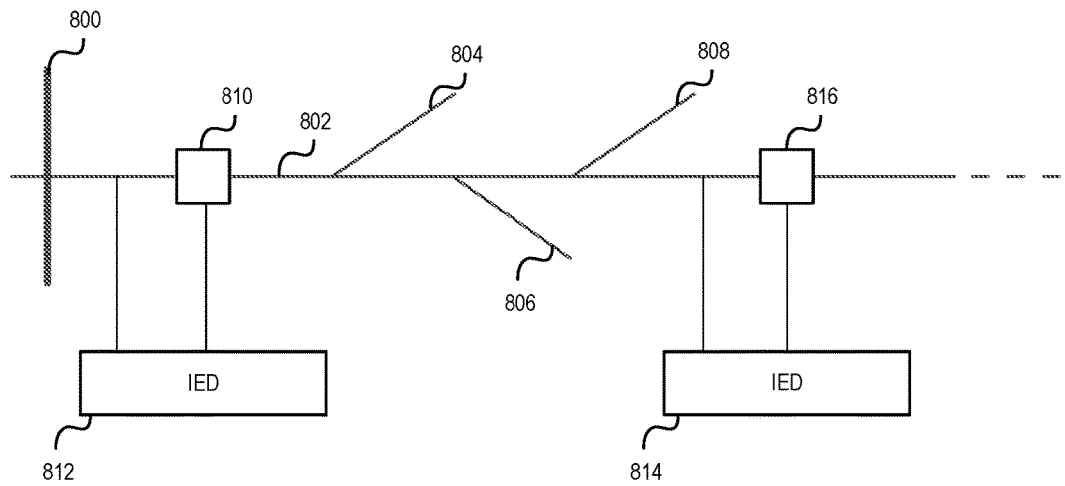
FIG. 8 illustrates a simplified one-line diagram of an electric power delivery system consistent with embodiments disclosed herein.

FIG. 8 illustrates a simplified one-line diagram of an electric power delivery system consistent with embodiments disclosed herein. As illustrated, a distribution bus 800 may be electrically coupled to a distribution feeder line 802 having a plurality of feeder lines 804-808 leading therefrom (e.g., feeder lines leading to one or more loads or the like). A first IED 812 may monitor certain measured parameters of a location of the feeder line 802 including, among other things, a current flow through the feeder line at the monitored location. For example, the first IED 812 may be associated with a distribution substation location of an electric power delivery system. The first IED 812 may be communicatively coupled with a breaker 810 that may be configured to disconnect a portion of the electric power delivery system when actuated by the first IED 812 (e.g., in response to the first IED 812 detecting an event or the like). A second IED 814 may similarly monitor measured parameters (e.g., current) of another location of the feeder line 802 and be configured to actuate (e.g., trip) a communicatively coupled breaker 816 upon detecting an event.

Figure 9:
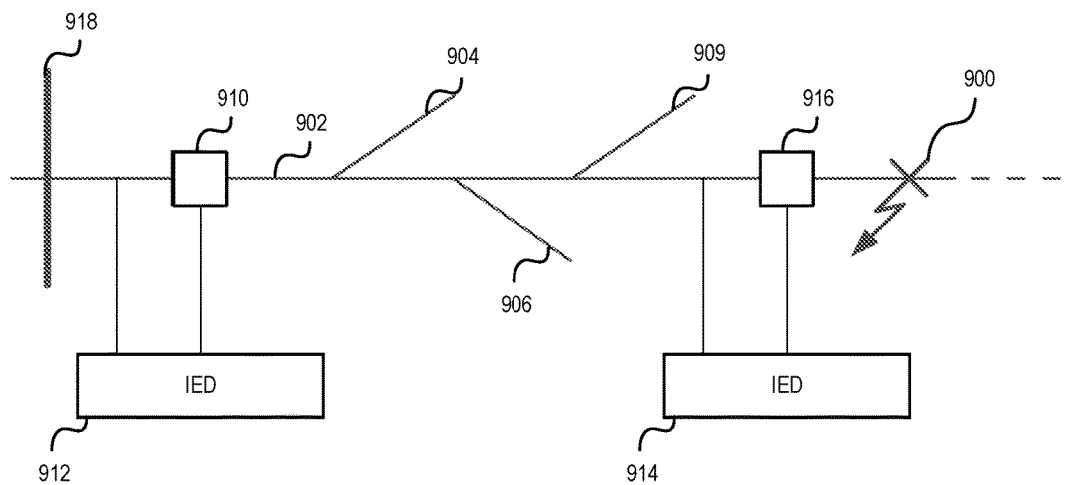
FIG. 9 illustrates a simplified one-line diagram of an electric power delivery system, consistent with embodiments disclosed herein, experiencing a fault.

FIG. 9 illustrates a simplified one-line diagram of an electric power delivery system experiencing an event such as a fault 900 consistent with embodiments disclosed herein. As illustrated, the fault 900 may occur on a distribution feeder line 902 due to a variety of conditions (e.g., when tree or other object contacts the line and/or when a conductor contacts the ground). A first IED 912 and a second IED 914 may monitor interharmonic content of measured current signals on the distribution feeder line 902. Based on the monitored interharmonic content, the first IED 912 and the second IED 914 may identify the occurrence of the fault 900 on the distribution feeder line 902 and take one or more suitable protective action(s) to mitigate potentially unsafe conditions and damage to the electric power delivery system. For example, upon detecting the occurrence of the fault 900, the second IED 914 may trip a first breaker 916, thereby isolating the fault 900 from the electric power delivery system due to the second IED 914 monitoring a location further away from the distribution bus 918 than the first IED 912.

Figure 10A:
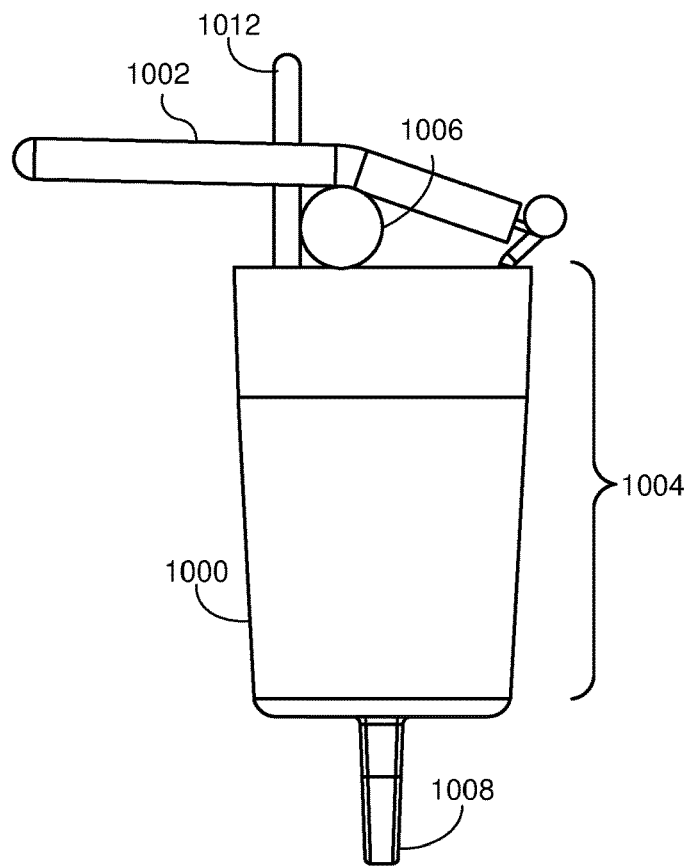
FIGS. 10A and 10B illustrate perspective views of conductor-mounted devices.

FIG. 10A illustrates a side view of a conductor-mounted device (CMD) 1000. The CMD 1000 may include a housing 1004 and a protruding eye 1008 that allows for the use of a hot stick during installation to or removal from a conductor 1006. The housing 1004 houses the various circuitry and other modules of the CMD 1000. One component in the housing 1004 is a current transformer (discussed below). The current transformer includes a pole piece 1012 that extends through the housing 1004 in an orientation that is generally perpendicular to the rear face of the housing 1004. The exterior portion of the pole piece 1012 may be coated with an insulating material or may have an insulating sleeve disposed thereon. A clamp assembly 1002 attaches the CMD 1000 to the monitored conductor 1006 (where the monitored conductor could be, e.g., a cable), and holds the conductor 1006 in close proximity to the pole piece 1012 of the current transformer. The clamp assembly 1002 is designed to accommodate a range of conductors 1006 having different diameters. When installed on a typical overhead conductor, the CMD 1000 hangs such that the pole piece 1012 is directed generally upward.

Figure 10B:
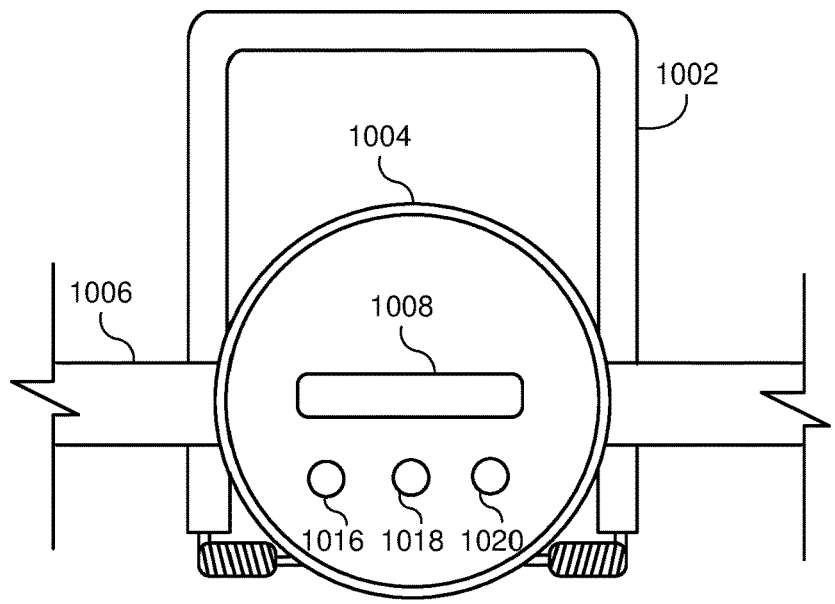

FIG. 10B illustrates a face of the CMD 1000 which is directed in a downward direction when the CMD 1000 is installed on a typical overhead conductor. The face may include a plurality of transmitters such as, for example, a fiber-optic port 1016 (such as an ST connector), a radio antenna 1018, and an LED 1020. The transmitters 1016-1020 may be configured to supply the high-speed communication using light (e.g., infrared over fiber optics or a laser), radio, and/or visual light (using the LED 1020). The CMD 1000 may be in communication with a particular IED using one or more of the transmitters 1016-1020.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

It will be obvious to those having skill in the art that many changes may be made to the details of the above-described embodiments without departing from the underlying principles of the invention. The scope of the present invention should, therefore, be determined only by the following claims.

The invention claimed is:

1. A method for one-way communication, comprising:
generating a message;
transmitting the message by a transmitter across a first communication channel;
transmitting the message by the transmitter across a second communication channel; and
if the message is received by one of a first receiver receiving on the first communication channel and a second receiver receiving on the second communication channel, configuring the first receiver to receive messages across a third communication channel.

2. The method of claim 1, wherein if the message is received by one of the first receiver receiving on the first communication channel and the second receiver receiving on the second communication channel, configuring the second receiver to receive messages across a fourth communication channel.

3. The method of claim 2, wherein the second communication channel is one channel ahead of the first communication channel in a predetermined hopping sequence.

4. The method of claim 3, wherein the third communication channel is two channels ahead of the first communication channel in the predetermined hopping sequence.

5. The method of claim 3, wherein the fourth communication channel is two channels ahead of the second communication channel in the predetermined hopping sequence.

6. The method of claim 2, wherein the third communication channel is one channel ahead of the first communication channel in a predetermined hopping sequence.

7. The method of claim 6, wherein the fourth communication channel is one channel ahead of the second communication channel in the predetermined hopping sequence.

8. The method of claim 6, wherein the fourth communication channel is one channel ahead of the second communication channel in a separate predetermined hopping sequence.

9. The method of claim 1, wherein generating the message comprises generating a heartbeat signal message.

10. The method of claim 1, wherein generating the message comprises generating a fault message to be transmitted twice by the transmitter across the first communication channel and to be transmitted twice by the transmitter across the second communication channel.

11. A method for one-way communication, comprising:
generating a message;
transmitting the message by a transmitter across a pair of channels, including a first communication channel in a predetermined hopping sequence and a second communication channel in the predetermined hopping sequence;
generating a next message; and
transmitting the next message by the transmitter across a next pair of channels according to the predetermined hopping sequence;
wherein the second communication channel is one channel ahead of the first communication channel in the predetermined hopping sequence;
wherein the next pair of channels includes a third communication channel and a fourth communication channel; and,
wherein the third communication channel is two channels ahead of the first communication channel in the predetermined hopping sequence and the fourth communication channel is two channels ahead of the second communication channel in the predetermined hopping sequence.

12. A system for one-way communication, comprising:
a transmitter to transmit a message on a first communication channel and a second communication channel;
a first configurable receiver and a second configurable receiver in electrical communication,
the first receiver to receive messages from the transmitter on the first communication channel, and
the second receiver to receive messages from the transmitter on the second communication channel, wherein
if one of the first configurable receiver and the second configurable receiver receives the message, then the first configurable receiver moves to receive messages on a third communication channel.

13. The system of claim 12, wherein if one of the first configurable receiver and the second configurable receiver receives the message, then the second configurable receiver moves to receive messages on a fourth communication channel.

14. The system of claim 12, wherein the first configurable receiver moving to receive messages on a third communication channel comprises the first configurable receiver moving forward two hops in a predetermined hopping sequence.

15. The system of claim 13, wherein the second configurable receiver moving to receive messages on a fourth communication channel comprises the second configurable receiver moving forward two hops in a predetermined hopping sequence.

16. The system of claim 12, wherein the second communication channel is one channel ahead of the first communication channel in a predetermined hopping sequence.

17. The system of claim 12, wherein the first and second receivers are configured to receive heartbeat messages from the transmitter.

18. The system of claim 12, wherein the first and second receivers are configured to receive one or more fault messages from the transmitter.

19. The system of claim 12, further comprising:
a conductor mounted device (CMD) to be in electrical communication with an electric power delivery system, the CMD configured to obtain measurements therefrom, detect a fault condition, and send communications related to one or more of the obtained measurements and the fault condition, the CMD comprising the transmitter; and
an intelligent electronic device (IED) configured to monitor power conditions of the electric power delivery system, the IED comprising:
a memory module that includes instructions that when executed provide communication and monitoring functions;
a processor in communication with the memory module configured to execute the instructions;
the first configurable receiver; and
the second configurable receiver.

20. The system of claim 19, wherein the CMD is configured to transmit, via the transmitter, one of a heartbeat signal and a fault communication on the first communication channel and the second communication channel, and to change the communications channels on which the transmitter transmits according to a hopping sequence in compliance with a one-way communication protocol.

* * * * *